US010626750B2

(12) United States Patent
Bera et al.

(10) Patent No.: US 10,626,750 B2
(45) Date of Patent: Apr. 21, 2020

(54) TOP-PRESSURE RECOVERY TURBINE DEPOSITION CONTROL

(71) Applicant: Ecolab USA Inc., St. Paul, MN (US)

(72) Inventors: Tarun Kumar Bera, Pune (IN); Fan Yang, Shanghai (CN); Jiaqi Zhang, Shanghai (CN); Glenn L. Scattergood, Sugar Land, TX (US); Roger W. Fowee, Wheaton, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/835,819

(22) Filed: Dec. 8, 2017

(65) Prior Publication Data

US 2018/0163564 A1 Jun. 14, 2018

Related U.S. Application Data

(60) Provisional application No. 62/432,239, filed on Dec. 9, 2016.

(51) Int. Cl.
*F01D 25/00* (2006.01)
*C21B 5/06* (2006.01)
(Continued)

(52) U.S. Cl.
CPC ........... *F01D 25/007* (2013.01); *B01D 53/00* (2013.01); *C10K 1/12* (2013.01); *C10K 1/121* (2013.01);
(Continued)

(58) Field of Classification Search
CPC ..... F01D 25/007; B01D 53/00; F27D 17/008; C10K 1/143; C10K 1/121; C10K 1/12; C10K 3/06; Y02P 20/131; F02C 6/18; C21B 7/002; C21B 2100/80; C21B 5/06; C21B 7/007; C21B 2100/62; C21B 2100/44

See application file for complete search history.

(56) References Cited

U.S. PATENT DOCUMENTS 3,625,859 A 12/1971 Hashimoto et al.
4,062,764 A 12/1977 White et al.
(Continued)

FOREIGN PATENT DOCUMENTS

CN 100580141 C 1/2010
CN 102296296 A 12/2011
(Continued)

OTHER PUBLICATIONS

English Translation of CN104962922 (Year: 2015).*
(Continued)

*Primary Examiner* — Andrew J. Oyer
(74) *Attorney, Agent, or Firm* — Leydig, Voit & Mayer, Ltd.

(57) ABSTRACT

Disclosed are methods useful in applications relating to blast furnace processes. The methods of the present invention provide enhanced deposition inhibition of particulate matter in top-pressure recovery turbines. The methods of the present invention comprise adding nitrogen-containing compounds to a top-pressure recovery turbine, inhibiting deposition of solids formed from blast furnace gas on top-pressure recovery turbine components.

11 Claims, 3 Drawing Sheets

(51) Int. Cl.
*C10K 1/12* (2006.01)
*F27D 17/00* (2006.01)
*B01D 53/00* (2006.01)
*C10K 1/14* (2006.01)
*C10K 3/06* (2006.01)
*C21B 7/00* (2006.01)
*F02C 6/18* (2006.01)

(52) U.S. Cl.
CPC ............... *C10K 1/143* (2013.01); *C10K 3/06* (2013.01); *C21B 5/06* (2013.01); *C21B 7/007* (2013.01); *F27D 17/008* (2013.01); *C21B 7/002* (2013.01); *C21B 2100/44* (2017.05); *C21B 2100/62* (2017.05); *C21B 2100/80* (2017.05); *F02C 6/18* (2013.01); *Y02P 20/131* (2015.11)

(56) References Cited

U.S. PATENT DOCUMENTS

| | | | |
|---|---|---|---|
| 4,454,059 | A | 6/1984 | Pindar et al. |
| 5,223,164 | A | 6/1993 | Kanamori |
| 5,641,396 | A | 6/1997 | Braden et al. |
| 5,714,664 | A | 2/1998 | Fearnside et al. |
| 5,965,785 | A | 10/1999 | Braden et al. |
| 6,010,986 | A | 1/2000 | Stachew et al. |
| 6,844,299 | B2 | 1/2005 | Bessonette et al. |
| 8,969,266 | B2 | 3/2015 | Crawley et al. |
| 2012/0065112 | A1 | 3/2012 | Wardlow et al. |

FOREIGN PATENT DOCUMENTS

| | | | |
|---|---|---|---|
| CN | 101392378 | B | 1/2012 |
| CN | 103225005 | A | 7/2013 |
| CN | 103243189 | A | 8/2013 |
| CN | 102443806 | B | 7/2014 |
| CN | 104962922 | A * | 10/2015 |
| CN | 104962922 | A | 10/2015 |
| DE | 19616569 | A1 | 10/1997 |
| GB | 824114 | A | 11/1959 |
| JP | S55-147137 | A | 11/1980 |
| JP | 2005-029816 | A | 2/2005 |
| JP | 2005029816 | A * | 2/2005 |
| JP | 2007-262567 | A | 10/2007 |
| JP | 2012-219315 | A | 11/2012 |
| JP | 2015-030694 | A | 2/2015 |

OTHER PUBLICATIONS

English Translation of JP2005029816 (Year: 2005).*
European Patent Office, International Search Report in International Patent Application No. PCT/US2017/065272, dated Mar. 19, 2018, 5 pp.
European Patent Office, Written Opinion in International Patent Application No. PCT/US2017/065272, dated Mar. 19, 2018, 5 pp.
Nakamura, "Top Pressure Recovery Turbine (TRT)," *Proc. of International Conference on Power Engineering*, Xian, China, pp. 882-889 (Oct. 8-12, 2001).
Peterson et al., "Choosing a neutralising amine corrosion inhibitor," *Digital Refining*, Article No. 1000509, PTQ Q3 2004, pp. 1-8.
Thompson et al., "IUTAM Symposium of Understanding Common Aspects of Extreme Events in Fluids: Patterns, oscillations, and microtornadoes: Extreme events in vapor-to-particle reaction zones," *Procedia IUTAM*, vol. 9, pp. 138-164 (2013).
Zhou et al., "Study on Corrosion Scale Inhibitor for Blast Furnace Gas TRT System," *Advanced Materials Research*, vols. 864-867, pp. 1342-1345 (2014).

* cited by examiner

TOP-PRESSURE RECOVERY TURBINE DEPOSITION CONTROL

This application is a nonprovisional application claiming the benefit of U.S. Provisional Patent Application Ser. No. 62/432,239, filed Dec. 9, 2016, the disclosure of which is incorporated herein by reference in its entirety.

FIELD OF INVENTION

The invention relates to methods for reducing deposition of solids in a turbine system.

BACKGROUND OF THE INVENTION

Blast furnaces, systems used to smelt industrial metal, release high pressure and high temperature gases that can be utilized as a heat or electric source. The top gas that emerges from the top of the blast furnace is typically cleaned to remove large particulate matter, and used in a metal-producing plant as a fuel for heating or is fed into a top-pressure recovery turbine to generate electricity. Top-pressure recovery turbines (TRTs) are rotary mechanical devices used to extract energy from blast furnace gas by converting gas pressure and thermal energy to mechanical energy. Top-pressure recovery turbines generate power utilizing the expansion of gas volume with the reduction of its pressure. The high-temperature high-pressure gas enters the top-pressure recovery turbine where it expands down to the exhaust pressure, producing a shaft work output. The turbine shaft work can be used to power a device such as an electric generator coupled to the shaft. Generally, top-pressure recovery turbines increase the efficiency of blast furnace processes.

The composition of blast furnace gas (BFG) can vary based on the particular design of the blast furnace, its size, and the type of smelting. Blast furnace gas typically comprises ammonia, hydrochloric acid, sulfuric acid, nitrogen, carbon dioxide, carbon monoxide, sulfur dioxide, hydrogen, hydrogen sulfide, hydrogen cyanide, and water vapor at high temperature (e.g., greater than 70° C.) and elevated pressure (e.g., greater than 1 bar). Under certain conditions, acidic and basic blast furnace gases combine and precipitate to form deposits on turbine surfaces. For example, ammonia and hydrochloric acid combine to form ammonium chloride, a salt that readily adheres to turbine surfaces including the surfaces of blades and the inner cylinder.

Deposition of particulate matter on turbine surfaces can result in performance loss and equipment damage. For example, salt deposition on turbine blades can lead to blade work resistance, which results in a reduction in energy generated by the turbine. In addition, deposited salts can ionize into their respective acid and base, forming strong acid or base condensates on turbine surfaces. Strong acids and bases are corrosive substances that can destroy or damage metallic surfaces, which can lead to equipment damage and system failure.

Thus, it is important to prevent the formation of deposits and build-up of precipitates in top-pressure recovery turbine systems. Accordingly, there is a need for improved methods of limiting deposition of precipitates formed from blast furnace gases on the surfaces of top-pressure recovery turbine parts.

BRIEF SUMMARY OF THE INVENTION

In an embodiment, the invention provides a method of reducing deposition of blast furnace gas solids in a top-pressure recovery turbine in a metal-producing process. The method comprises adding a composition comprising ammonia to a top-pressure recovery turbine.

In another embodiment, the invention provides a method of reducing deposition of blast furnace gas solids in a top-pressure recovery turbine in a metal-producing process. The method comprises adding a composition comprising at least one amine to a top-pressure recovery turbine.

DETAILED DESCRIPTION OF THE INVENTION

"Alkanol" refers to a straight or branched hydrocarbon having one or more —OH groups attached.

"Alkenyl" refers to a straight or branched hydrocarbon having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups may be unsubstituted or substituted by one or more suitable substituents.

"Alkyl" refers to a straight-chain or branched alkyl substituent. Examples of such substituents include methyl, ethyl, propyl, isopropyl, n-butyl, sec-butyl, isobutyl, tert-butyl, pentyl, isoamyl, hexyl, and the like. Alkyl groups may be unsubstituted or substituted by one or more suitable substituents.

"Alkynyl" refers to a straight or branched hydrocarbon, and having one or more carbon-carbon triple bonds. Alkynyl groups include, but are not limited to, ethynyl, propynyl, and butynyl. Alkynyl groups may be unsubstituted or substituted by one or more suitable substituents.

"Amine" refers to a nitrogen-containing compound comprising one or more carbon substituents, such as alkyl or aryl group. The amine can be a primary, secondary, or tertiary amine. In certain embodiments, the amine is a primary or secondary amine.

"Aryl" refers to a moiety of the formula Ar—, where Ar is an aromatic unit. Aryl groups may be unsubstituted or substituted by one or more suitable substituents.

"Blast furnace gas" or "top gas" refers to gas produced by a blast furnace. Nonlimiting examples of components of blast furnace gas include ammonia, hydrochloric acid, sulfuric acid, nitrogen, carbon dioxide, carbon monoxide, sulfur dioxide, hydrogen, hydrogen sulfide, hydrogen cyanide, and water vapor.

"Blast furnace gas solid" refers to a solid formed from one or more components of a blast furnace gas. For example, blast furnace gas solids may form via reaction of a basic blast furnace gas and an acidic blast furnace gas. Nonlimiting examples of blast furnace gas solids include ammonium salts such as ammonium chloride and ammonium sulfate.

"Dry-type top-pressure recovery turbine" refers to a top-pressure recovery turbine that employs a dry-type dust collector to purify blast furnace gas (e.g., remove dust).

"Halogen" or "halo" refers to a moiety selected from fluorine, chlorine, bromine, and iodine.

"Injection quill" refers to a device used to inject one or more chemicals into the center of a line or pipe.

"Metal-producing process" refers to any process that utilizes a blast furnace to produce metal. Non-limiting examples of such processes include an iron-producing process, a steel-producing process, copper-producing process, lead-producing process, nickel-producing process, aluminum-producing process, and zinc-producing process.

"Top-pressure recovery turbine" or "TRT" refers to a turbine device capable of extracting energy from blast furnace gas. Equivalent terms include "top-gas-pressure recovery turbine," "top-gas recovery turbine," "pressure recovery turbine," "blast furnace gas pressure recovery turbine," "blast furnace gas top-pressure recovery turbine," "furnace top pressure recovery turbine," and the like.

"Wet-type top-pressure recovery turbine" refers to a top-pressure recovery turbine that employs scrubbers such as Venturi scrubbers to purify blast furnace gas (e.g., remove dust).

Whenever a range of the number of atoms in a structure is indicated (e.g., a $C_1$-$C_8$ alkyl, $C_2$-$C_8$ alkenyl, $C_2$-$C_8$ alkynyl, etc.), it is specifically contemplated that the substituent can be described by any of the carbon atoms in the sub-range or by any individual number of carbon atoms falling within the indicated range. By way of example, a description of the group such as an alkyl group using the recitation of a range of 1-8 carbon atoms (e.g., $C_1$-$C_8$), 1-7 carbon atoms (e.g., $C_1$-$C_7$), 1-6 carbon atoms (e.g., $C_1$-$C_6$), 1-5 carbon atoms (e.g., $C_1$-$C_5$), 1-4 carbon atoms (e.g., $C_1$-$C_4$), or 1-3 carbon atoms (e.g., $C_1$-$C_3$) encompasses and specifically describes an alkyl group having any of 1, 2, 3, 4, 5, 6, 7, or 8 carbon atoms, as appropriate, as well as any sub-range thereof (e.g., 1-2 carbon atoms, 1-3 carbon atoms, 1-4 carbon atoms, 1-5 carbon atoms, 1-6 carbon atoms, 1-7 carbon atoms, 1-8 carbon atoms, 2-3 carbon atoms, 2-4 carbon atoms, 2-5 carbon atoms, 2-6 carbon atoms, 2-7 carbon atoms, 2-8 carbon atoms, 3-4 carbon atoms, 3-5 carbon atoms, 3-6 carbon atoms, 3-7 carbon atoms, and/or 3-8 carbon atoms, as appropriate).

The invention provides methods for inhibiting or reducing the deposition of solids in a top-pressure recovery turbine system. Contrary to existing methods that only reduce corrosion in top-pressure recovery turbine systems, the methods of the present invention can inhibit the deposition of blast furnace gas solids in top-pressure recovery turbine systems. Applicants have discovered that adding acid neutralizing nitrogen-containing compounds to a top-pressure recovery turbine can inhibit or reduce deposition of solids formed from blast furnace gas. It was surprisingly and unexpectedly discovered that adding extraneous ammonia to a top-pressure recovery turbine decreases the formation and deposition of blast furnace gas solid.

Ammonia is a neutralizing nitrogen-containing compound having a boiling point lower than the typical temperature of a top-pressure recovery turbine system, and ammonium chloride has a melting point greater than the typical temperature of a top-pressure recovery turbine system. While not wishing to be bound by any particular theory, it is believed that nitrogen-containing compounds having a boiling point at or below the typical temperature range of a top-pressure recovery turbine system are good deposit inhibitors because they are more effective at neutralizing acid gases and hindering nucleation of blast furnace gas solids (e.g., ammonium chloride). While not wishing to be bound by any particular theory, it is also believed that nitrogen-containing compounds with a conjugate acid salt having a melting point greater than that of typical temperature range of a top-pressure recovery turbine system is an effective deposit inhibitor because the formed conjugate salt can more easily precipitate in the presence of the high flow of blast furnace gas in the top-pressure recovery turbine. In certain embodiments, the methods and compositions of the present invention reduce the formation of blast furnace gas solids in a top-pressure recovery turbine. In certain embodiments, the methods and compositions of the present invention reduce the amount of blast furnace gas solids already present in a top-pressure recovery turbine.

The methods of the present invention inhibit or reduce the amount of blast furnace gas solids that deposit in a top-pressure recovery turbine. In certain embodiments, a reduced amount of blast furnace gas solids are present in a top-pressure recovery turbine treated according to the present methods when compared to a top-pressure recovery turbine that has not been treated according to the present methods. In certain embodiments, the method decreases the amount of blast furnace gas solids that is present in the top-pressure recovery turbine. In certain embodiments, the method decreases the amount of blast furnace gas solids that deposit on the surfaces of a top-pressure recovery turbine. In certain embodiments, the method decreases the amount of blast furnace gas solids that deposit on the blades of a top-pressure recovery turbine. Nonlimiting examples of blast furnace gas solids include ammonium salts such as ammonium chloride, ammonium sulfate, ammonium sulfite, and ammonium carbonate salts. In certain embodiments, the compositions of the present methods reduce the amount of ammonium chloride in a top-pressure recovery turbine.

In certain embodiments, the top-pressure recovery turbine system comprises or consists essentially of dust collecting equipment, a top-pressure gas turbine, and a generator. When blast furnace gas is introduced into the top-pressure gas turbine, the generator can produce electricity. The top-pressure gas turbine is generally located downstream from the dust collecting equipment. The top-pressure recovery turbine system may comprise a dry-type dust collector or a wet-type dust collector. In certain embodiments, the top-pressure recovery turbine is a dry system that comprises a dry-type dust collector. In certain embodiments, the composition is added downstream from a dust collector (e.g., dry-type dust collector). In certain embodiments, the composition is added downstream from a dust collector and upstream from a top-gas pressure turbine. In certain embodiments, the composition is added directly to the top-gas pressure turbine.

In an embodiment, the invention provides a method of reducing deposition of blast furnace gas solids in a top-pressure recovery turbine in a metal-producing process. The method comprises adding a composition comprising ammonia to a top-pressure recovery turbine.

In certain embodiments, the ammonia is extraneous and is not derived from the blast furnace or a blast furnaces gas.

In certain embodiments, the composition comprises ammonia in liquid or gas form. In certain embodiments, the composition is an aqueous ammonia solution.

The composition may be introduced into the top-pressure recovery turbine system using any suitable method. In certain embodiments, the composition is introduced into the top-pressure recovery turbine system as a liquid or as a gas. In certain embodiments, the composition is introduced into the top-pressure recovery turbine system as an aqueous liquid or solution.

In certain embodiments, the composition is injected into the blast furnace gas in a top-pressure recovery turbine system. In certain embodiments, the composition is injected into the top-pressure recovery turbine system as a liquid using a spraying device such as an injection quill or one or more injection nozzles. In certain embodiments, the composition is injected into the top-pressure recovery turbine system as a gas using an injection quill or one or more injection nozzles. In certain embodiments, an inert gas such as nitrogen and argon can be used as a carrier gas for injection of the liquid composition into the top-pressure recovery turbine system.

In certain embodiments, the composition is added to a top-pressure recovery turbine by injecting the composition as an aqueous liquid into blast furnace gas in the top-pressure recovery turbine. In certain embodiments, the top-pressure recovery turbine comprises an injection port or inlet. In certain embodiments, the injection port is at a temperature of from about 35° C. to about 60° C. In certain embodiments, the injection port is at a temperature of from about 50° C. to about 60° C.

Ammonia may be added to the top-pressure recovery turbine in any amount. In certain embodiments, the molar amount of ammonia is greater than the molar amount of acid present in the blast furnace gas.

In certain embodiments, ammonia is added to the top-pressure recovery turbine and is present in the top-pressure recovery turbine at a concentration of from about 0.001 ppm to about 100,000 ppm. Thus, in certain embodiments, ammonia is added to the top-pressure recovery turbine and is present in the top-pressure recovery turbine at a concentration of from about 0.001 ppm to about 100,000 ppm, 0.01 ppm to about 100,000 ppm, from about 0.1 ppm to about 100,000 ppm, from about 1 ppm to about 100,000 ppm, from about 10 ppm to about 100,000 ppm, from about 100 ppm to about 100,000 ppm, from about 1,000 ppm to about 100,000 ppm, 0.001 ppm to about 50,000 ppm, 0.01 ppm to about 50,000 ppm, 0.1 ppm to about 50,000 ppm, 1 ppm to about 50,000 ppm, 10 ppm to about 50,000 ppm, from about 0.001 ppm to about 25,000 ppm, 0.01 ppm to about 25,000 ppm, 0.1 ppm to about 25,000 ppm, 1 ppm to about 25,000 ppm, 10 ppm to about 25,000 ppm, from about 0.001 ppm to about 10,000 ppm, from about 0.01 ppm to about 10,000 ppm, from about 0.1 ppm to about 10,000 ppm, from about 1 ppm to about 10,000 ppm, from about 0.001 ppm to about 5,000 ppm, from about 0.01 ppm to about 5,000 ppm, from about 0.1 ppm to about 5,000 ppm, from about 1 ppm to about 5,000 ppm, from about 0.001 ppm to about 1,000 ppm, from about 0.01 ppm to about 1,000 ppm, from about 0.1 ppm to about 1,000 ppm, from about 1 ppm to about 1,000 ppm, from about 0.001 ppm to about 100 ppm, from about 0.01 ppm to about 100 ppm, from about 0.1 ppm to about 100 ppm, or from about 1 ppm to about 100 ppm. In certain embodiments, ammonia is added to the top-pressure recovery turbine and is present in the top-pressure recovery turbine at a concentration of from about 0.01 ppm to about 10,000 ppm.

It has also been discovered that compositions comprising ammonia and an amine are effective deposit inhibitors. Thus, in certain embodiments, the composition further comprises at least one amine. In certain embodiments, the amine is a primary amine or a secondary amine. In certain embodiments, the amine is a secondary cyclic amine or a secondary acyclic amine. In certain embodiment, the amine is a tertiary amine.

In certain embodiments, the composition comprises ammonia and a compound of formula (I)

formula (I)

wherein X is selected from O, S, or $CH_2$ and $R^1$ is selected from hydrogen, halogen, $C_1$-$C_8$ alkyl, $C_2$-$C_8$ alkenyl, $C_2$-$C_8$ alkynyl, or aryl, or X is $NR^2$ and each $R^1$ and $R^2$ is the same or different and is selected from hydrogen, halogen, $C_1$-$C_8$ alkyl, $C_2$-$C_8$ alkenyl, $C_2$-$C_8$ alkynyl, or aryl; and wherein each m and n is the same or different and is selected from 0, 1, or 2.

In certain embodiments, $R^1$ is hydrogen.

In certain embodiments, m and n are 1.

In certain embodiments, X is oxygen.

In certain embodiments, the compound of formula (I) is morpholine, pyrrolidine, azetidine, pyrazolidine, imidazolidine, oxazolidine, thiazolidine, isothiazolidine, thiomorpholine, piperadine, piperazine, homopiperazine, azepane, thiomorpholine, azocane, azonane, aziridine, or a combination thereof.

In certain embodiments, the compound of formula (I) is morpholine (CAS No. 110-91-8).

In certain embodiments, the composition comprises ammonia and a compound of formula (II)

formula (II)

wherein X is O, $NR^2$, S, or $CH_2$; each $R^1$ and $R^2$ is the same or different and is selected from hydrogen, halogen, $C_1$-$C_8$ alkyl, $C_2$-$C_8$ alkenyl, $C_2$-$C_8$ alkynyl, or aryl; and each m and n is the same or different and is selected from 0, 1, or 2.

In certain embodiments, $R^1$ and $R^2$ are hydrogen.

In certain embodiments, m and n are 1.

In certain embodiments, X is $CH_2$.

In certain embodiments, X is oxygen.

In certain embodiments, the compound of formula (II) is

, where Me is methyl.

In certain embodiments, the compound of formula (II) is

In certain embodiments, the compound of formula (II) is

In certain embodiments, the compound of formula (II) is

In certain embodiments, the compound of formula (II) is

In certain embodiments, the compound of formula (II) is

In certain embodiments, the compound of formula (II) is cyclohexylamine (CAS No. 108-91-8).

In certain embodiments, the composition comprises ammonia and a compound of formula (III)

formula (III)

wherein each $R^1$ and $R^2$ is the same or different and is selected from hydrogen, halogen, $C_1$-$C_8$ alkyl, $C_1$-$C_8$ alkanol, $C_2$-$C_8$ alkenyl, $C_2$-$C_8$ alkynyl, or aryl.

In certain embodiments, the compound of formula (III) has a molecular weight of from about 25 g/mol to about 250 g/mol. In certain embodiments, the compound of formula (III) has a molecular weight of from about 50 g/mol to about 150 g/mol.

In certain embodiments, $R^1$ and $R^2$ are $C_1$-$C_6$ alkyl.

In certain embodiments, $R^1$ is $C_1$-$C_6$ alkanol.

In certain embodiments, the compound of formula (III) is a primary amine.

In certain embodiments, the compound of formula (III) is a secondary amine.

In certain embodiments, the compound of formula (III) is diethylamine (CAS No. 109-89-7).

The ratio of ammonia to amine is not limited. In certain embodiments, the composition comprises ammonia in an amount greater than the amount of amine. In certain embodiments, the composition comprises ammonia and an amine at a molar ratio of from about 1:1 to about 20:1. Thus, in certain embodiment, the composition comprises ammonia and an amine at a molar ratio of from about 1:1 to about 20:1, from about 1:1 to about 15:1, from about 1:1 to 10:1, from about 1:1 to about 9:1, from about 1:1 to about 8:1, from about 1:1 to about 7:1, from about 1:1 to about 6:1, from about 1:1 to about 5:1, from about 1:1 to about 4:1, from about 1:1 to about 3:1, or from about 1:1 to about 2:1. In certain embodiments, the composition comprises ammonia and an amine at a molar ratio of from 1:1 to about 10:1. In certain embodiments, the composition comprises ammonia and an amine at a molar ratio of from 2:1 to about 5:1.

In certain embodiments, the amine has a boiling point at atmospheric pressure (i.e., about 1 atm) of from about −40° C. to about 175° C. Thus, in certain embodiments, the amine has a boiling point at atmospheric pressure of from about −40° C. to about 175° C., from about −40° C. to about 160° C., from about −40° C. to about 150° C., from about −40° C. to about 140° C., from about −40° C. to about 130° C., from about −40° C. to about 125° C., from about −40° C. to about 120° C., from about −40° C. to about 110° C., from about −40° C. to about 100° C., from about −40° C. to about 90° C., from about −40° C. to about 80° C., from about −40° C. to about 75° C., from about −30° C. to about 175° C., from about −20° C. to about 175° C., from about −10° C. to about 175° C., from about 0° C. to about 175° C., from about 10° C. to about 175° C., from about 25° C. to about 175° C., from about 40° C. to about 175° C., from about 50° C. to about 175° C., from about 25° C. to about 150° C., from about 25° C. to about 125° C., or from about 50° C. to about 125° C. In certain embodiments, the amine has a boiling point at atmospheric pressure of from about −40° C. to about 110° C. In certain embodiments, the amine has a boiling point atmospheric pressure of from about 50° C. to about 125° C.

The amine can be of any suitable molecular weight. In certain embodiments, the amine has a molecular weight of from about 28 g/mol to about 400 g/mol. Thus, in certain embodiments, the amine has a molecular weight of from about 28 g/mol to about 400 g/mol, from about 28 g/mol to about 350 g/mol, from about 28 g/mol to about 300 g/mol, from about 28 g/mol to about 250 g/mol, from about 28 g/mol to about 200 g/mol, from about 28 g/mol to about 150 g/mol, from about 28 g/mol to about 125 g/mol, from about 28 g/mol to about 100 g/mol, from about 30 g/mol to about 250 g/mol, from about 40 g/mol to about 250 g/mol, from about 50 g/mol to about 250 g/mol, or from about 75 g/mol to about 200 g/mol. In certain embodiments, the amine has a molecular weight of from about 28 g/mol to about 250 g/mol. In certain embodiments, the amine has a molecular weight of from about 40 g/mol to about 200 g/mol.

In certain embodiments, the composition comprises ammonia, a compound of formula (I), and a compound of formula (II). In certain embodiments, the composition comprises ammonia, a compound of formula (I), and a compound of formula (III). In certain embodiments, the composition comprises ammonia, a compound of formula (II), and a compound of formula (III). In certain embodiments, the composition comprises ammonia, cyclohexylamine, and morpholine.

In certain embodiments, the composition comprises ammonia in an amount greater than the amount of cyclohexylamine and morpholine by weight. In certain embodiments, the composition comprises 10-25% ammonia, 5-10% cyclohexylamine, 5-10% morpholine, and 45-80% water by weight, based on weight of the composition.

An amine (e.g., a compound of formula (I), (II), or (III)) may be added to a top-pressure recovery turbine in any amount.

In certain embodiments, an amine is added to the top-pressure recovery turbine and is present in the top-pressure recovery turbine at a concentration of from about 0.01 ppm to about 100,000 ppm. Thus, in certain embodiments, an amine is added to the top-pressure recovery turbine and is present in the top-pressure recovery turbine at a concentration of from about 0.001 ppm to about 100,000 ppm, 0.01 ppm to about 100,000 ppm, from about 0.1 ppm to about 100,000 ppm, from about 1 ppm to about 100,000 ppm, from about 10 ppm to about 100,000 ppm, from about 100 ppm to about 100,000 ppm, from about 1,000 ppm to about 100,000 ppm, 0.001 ppm to about 50,000 ppm, 0.01 ppm to about 50,000 ppm, 0.1 ppm to about 50,000 ppm, 1 ppm to about 50,000 ppm, 10 ppm to about 50,000 ppm, from about 0.001 ppm to about 25,000 ppm, 0.01 ppm to about 25,000 ppm, 0.1 ppm to about 25,000 ppm, 1 ppm to about 25,000 ppm, 10 ppm to about 25,000 ppm, from about 0.001 ppm to about 10,000 ppm, from about 0.01 ppm to about 10,000 ppm, from about 0.1 ppm to about 10,000 ppm, from about 1 ppm to about 10,000 ppm, from about 0.001 ppm to about 5,000 ppm, from about 0.01 ppm to about 5,000 ppm, from about 0.1 ppm to about 5,000 ppm, from about 1 ppm to about 5,000 ppm, from about 0.001 ppm to about 1,000 ppm, from about 0.01 ppm to about 1,000 ppm, from about 0.1 ppm to about 1,000 ppm, from about 1 ppm to about 1,000 ppm, from about 0.001 ppm to about 100 ppm, 0.01 ppm to about 100 ppm, from about 0.1 ppm to about 100 ppm, or from about 1 ppm to about 100 ppm. In certain embodiments, an amine is added to the top-pressure recovery turbine and is present in the top-pressure recovery turbine at a concentration of from about 0.01 ppm to about 10,000 ppm.

The ammonia and amine can be added separately or in combination to the top-pressure recovery turbine system. In certain embodiments, the ammonia and amine are added in combination to the top-pressure recovery turbine system.

The composition can be added in any form, including as a solution or in the absence of solvent. In certain embodiments, the composition is an aqueous solution. In certain embodiments, the composition is an aqueous solution comprising water in an amount of at least about 50%. Thus, in certain embodiments, the composition is an aqueous solution comprising water in an amount of at least about 50%, at least about 55%, at least about 60%, at least about 65%, at least about 70%, at least about 75%, at least about 80%, at least about 85%, at least about 90%, or at least about 95%. In certain embodiments, the composition is an aqueous solution comprising water in an amount of from about 50% to about 95%.

In certain embodiments, the composition is added to the top-pressure recovery turbine as a solution in a water-miscible co-solvent including, but not limited to, acetone, methanol, ethanol, propanol, propylene glycol, ethylene glycol, and combinations thereof.

In certain embodiments, the composition inhibits deposition of blast furnace gas solids by at least about 70%. Thus, in certain embodiments, the composition inhibits deposition of blast furnace gas solids by at least about 70%, at least about 75%, at least about 80%, at least about 85%, at least about 90%, at least about 95%, at least about 96%, at least about 97%, at least about 98%, at least about 99%, or at least about 99.9%. In certain embodiments, the composition inhibits deposition of blast furnace gas solids by at least about 80%. In certain embodiments, the composition inhibits deposition of blast furnace gas solids by from about 80% to about 99.9%.

Since many blast furnace gas salts are corrosive, inhibition or reduction of deposition of such compounds decreases the rate of corrosion of metal in the top-pressure recovery turbines. In certain embodiments, the composition inhibits corrosion of metal by at least about 70%. Thus, in certain embodiments, the composition inhibits corrosion of metal by at least about 70%, at least about 75%, at least about 80%, at least about 85%, at least about 90%, at least about 95%, at least about 96%, at least about 97%, at least about 98%, at least about 99%, or at least about 99.9%. In certain embodiments, the composition inhibits corrosion of metal by at least about 80%. In certain embodiments, the composition inhibits corrosion of metal by about 80% to about 99.9%.

The methods of the present invention can be used in any metal-producing process that utilizes a blast furnace. In certain embodiments, a method of the present invention is used in a transition metal-producing process. In certain embodiments, a method of the present invention is used in a noble metal-producing process. In certain embodiments, a method of the present invention is used in a lead-producing process. In certain embodiments, a method of the present invention is used in a copper-producing process. In certain embodiments, a method of the present invention is used in a zinc-producing process. In certain embodiments, a method of the present invention is used in an iron-producing process. In certain embodiments, a method of the present invention is used in a steel-producing process.

In another embodiment, the invention provides a method of reducing deposition of blast furnace gas solids in a top-pressure recovery turbine in a metal-producing process. The method comprises adding a composition comprising at least one amine to a top-pressure recovery turbine.

In certain embodiments, the amine is a primary amine or secondary amine. In certain embodiments, the amine is a secondary cyclic amine or a primary acyclic amine. In certain embodiments, the amine is a tertiary amine.

In certain embodiments, the amine is a compound of formula (I)

formula (I)

wherein X is selected from O, S, or CH$_2$ and R$^1$ is selected from hydrogen, halogen, C$_1$-C$_8$ alkyl, C$_2$-C$_8$ alkenyl, C$_2$-C$_8$ alkynyl, or aryl, or X is NR$^2$ and each R$^1$ and R$^2$ is the same or different and is selected from hydrogen, halogen, C$_1$-C$_8$ alkyl, C$_2$-C$_8$ alkenyl, C$_2$-C$_8$ alkynyl, or aryl; and wherein each m and n is the same or different and is selected from 0, 1, or 2.

In certain embodiments, R$^1$ is hydrogen.
In certain embodiments, m and n are 1.
In certain embodiments, X is oxygen.
In certain embodiments, the compound of formula (I) is In certain embodiments, the compound of formula (I) is In certain embodiments, the compound of formula (I) is where Me is methyl.

In certain embodiments, the compound of formula (I) is morpholine, pyrrolidine, azetidine, pyrazolidine, imidazolidine, oxazolidine, thiazolidine, isothiazolidine, thiomorpholine, piperadine, piperazine, homopiperazine, azepane, thiomorpholine, azocane, azonane, aziridine, or a combination thereof.

In certain embodiments, the compound of formula (I) is morpholine (CAS No. 110-91-8).

In certain embodiments, the amine is a compound of formula (II)

wherein X is O, NR$^2$, S, or CH$_2$; each R$^1$ and R$^2$ is the same or different and is selected from hydrogen, halogen, C$_1$-C$_8$ alkyl, C$_2$-C$_8$ alkenyl, C$_2$-C$_8$ alkynyl, or aryl; and each m and n is the same or different and is selected from 0, 1, or 2.

In certain embodiments, R$^1$ and R$^2$ are hydrogen.
In certain embodiments, m and n are 1.
In certain embodiments, X is CH$_2$.
In certain embodiments, X is oxygen.
In certain embodiments, the compound of formula (II) is where Me is methyl.

In certain embodiments, the compound of formula (II) is

In certain embodiments, the compound of formula (II) is

In certain embodiments, the compound of formula (II) is

In certain embodiments, the compound of formula (II) is

In certain embodiments, the compound of formula (II) is

In certain embodiments, the compound of formula (II) is cyclohexylamine (CAS No. 108-91-8).

In certain embodiments, the amine is a compound of formula (III)

formula (III)

wherein each $R^1$ and $R^2$ is the same or different and is selected from hydrogen, halogen, $C_1$-$C_8$ alkyl, $C_1$-$C_8$ alkanol, $C_2$-$C_8$ alkenyl, $C_2$-$C_8$ alkynyl, or aryl.

In certain embodiments, the compound of formula (III) has a molecular weight of from about 20 g/mol to about 250 g/mol. In certain embodiments, the compound of formula (III) has a molecular weight of from about 50 g/mol to about 150 g/mol.

In certain embodiments, the compound of formula (III) is monoethanolamine (CAS No. 141-43-5).

In certain embodiments, the compound of formula (III) is diethylamine (CAS No. 109-89-7).

The amine can be of any suitable molecular weight. In certain embodiments, the amine has a molecular weight of from about 28 g/mol to about 400 g/mol. Thus, in certain embodiments, the amine has a molecular weight of from about 28 g/mol to about 400 g/mol, from about 28 g/mol to about 350 g/mol, from about 28 g/mol to about 300 g/mol, from about 28 g/mol to about 250 g/mol, from about 28 g/mol to about 200 g/mol, from about 28 g/mol to about 150 g/mol, from about 28 g/mol to about 125 g/mol, from about 28 g/mol to about 100 g/mol, from about 30 g/mol to about 250 g/mol, from about 40 g/mol to about 250 g/mol, from about 50 g/mol to about 250 g/mol, or from about 75 g/mol to about 200 g/mol. In certain embodiments, the amine has a molecular weight of from about 28 g/mol to about 250 g/mol. In certain embodiments, the amine has a molecular weight of from about 40 g/mol to about 200 g/mol.

In certain embodiments, the amine has a boiling point at atmospheric pressure (i.e., about 1 atm) of from about −40° C. to about 175° C. Thus, in certain embodiments, the amine has a boiling point at atmospheric pressure of from about −40° C. to about 175° C., from about −40° C. to about 160° C., from about −40° C. to about 150° C., from about −40° C. to about 140° C., from about −40° C. to about 130° C., from about −40° C. to about 125° C., from about −40° C. to about 120° C., from about −40° C. to about 110° C., from about −40° C. to about 100° C., from about −40° C. to about 90° C., from about −40° C. to about 80° C., from about −40° C. to about 75° C., from about −30° C. to about 175° C., from about −20° C. to about 175° C., from about −10° C. to about 175° C., from about 0° C. to about 175° C., from about 10° C. to about 175° C., from about 25° C. to about 175° C., from about 40° C. to about 175° C., from about 50° C. to about 175° C., from about 25° C. to about 150° C., from about 25° C. to about 125° C., or from about 50° C. to about 125° C. In certain embodiments, the amine has a boiling point at atmospheric pressure of from about −40° C. to about 110° C. In certain embodiments, the amine has a boiling point at atmospheric pressure of from about 50° C. to about 125° C.

In certain embodiments, the composition comprises two or more amines. In certain embodiments, the composition comprises two or more compounds of formula (I). In certain embodiments, the composition comprises two or more compounds of formula (II). In certain embodiments, the composition comprises two or more compounds of formula (III).

In certain embodiments, the composition comprises a compound of formula (I) and a compound of formula (II). In certain embodiments, the composition comprises a compound of formula (I) and a compound of formula (III). In certain embodiments, the composition comprises a compound of formula (II) and a compound of formula (III). In certain embodiments, the composition comprises a compound of formula (I), a compound of formula (II), and a compound of formula (III). In certain embodiments, the composition comprises cyclohexylamine and morpholine.

In certain embodiments, the composition comprises a compound of formula (I) and a compound of formula (II) in a molar ratio of from about 1:1 to about 20:1. Thus, in certain embodiment, the composition comprises a compound of formula (I) and a compound of formula (II) at a molar ratio of from about 1:1 to about 20:1, from about 1:1 to about 15:1, from about 1:1 to about 10:1, from about 1:1 to about 9:1, from about 1:1 to about 8:1, from about 1:1 to about 7:1, from about 1:1 to about 6:1, from about 1:1 to about 5:1, from about 1:1 to about 4:1, from about 1:1 to about 3:1, or from about 1:1 to about 2:1. In certain embodiments, the composition comprises a compound of formula (I) and a compound of formula (II) at a molar ratio of from 1:1 to about 10:1. In certain embodiments, the composition comprises a compound of formula (I) and a compound of formula (II) at a molar ratio of from 1:1 to about 5:1.

In certain embodiments, the composition comprises a compound of formula (I) or a compound of formula (II) and a compound of formula (III) in a molar ratio of from about 1:1 to about 1:20. Thus, in certain embodiment, the composition comprises a compound of formula (I) or a compound of formula (II) and a compound of formula (III) at a molar ratio of from about 1:1 to about 1:20, from about 1:1 to about 1:15, from about 1:1 to about 1:10, from about 1:1 to about 1:9, from about 1:1 to about 1:8, from about 1:1 to about 1:7, from about 1:1 to about 1:6, from about 1:1 to about 1:5, from about 1:1 to about 1:4, from about 1:1 to about 1:3, or from about 1:1 to about 1:2. In certain embodiments, the composition comprises a compound of formula (I) or a compound of formula (II) and a compound of formula (III) at a molar ratio of from 1:1 to about 1:10. In certain embodiments, the composition comprises a compound of formula (I) or a compound of formula (II) and a compound of formula (III) at a molar ratio of from 1:1 to about 1:5.

An amine (e.g., a compound of formula (I), (II), or (III)) may be added to the top-pressure recovery turbine in any amount. In certain embodiments, an amine is added to the top-pressure recovery turbine and is present in the top-pressure recovery turbine at a concentration of from about 0.01 ppm to about 100,000 ppm. Thus, in certain embodiments, an amine is added to the top-pressure recovery turbine and is present in the top-pressure recovery turbine at a concentration of from about 0.001 ppm to about 100,000 ppm, 0.01 ppm to about 100,000 ppm, from about 0.1 ppm to about 100,000 ppm, from about 1 ppm to about 100,000 ppm, from about 10 ppm to about 100,000 ppm, from about 100 ppm to about 100,000 ppm, from about 1,000 ppm to about 100,000 ppm, 0.001 ppm to about 50,000 ppm, 0.01 ppm to about 50,000 ppm, 0.1 ppm to about 50,000 ppm, 1 ppm to about 50,000 ppm, 10 ppm to about 50,000 ppm, from about 0.001 ppm to about 25,000 ppm, 0.01 ppm to about 25,000 ppm, 0.1 ppm to about 25,000 ppm, 1 ppm to about 25,000 ppm, 10 ppm to about 25,000 ppm, from about 0.001 ppm to about 10,000 ppm, from about 0.01 ppm to about 10,000 ppm, from about 0.1 ppm to about 10,000 ppm, from about 1 ppm to about 10,000 ppm, from about 0.001 ppm to about 5,000 ppm, from about 0.01 ppm to about 5,000 ppm, from about 0.1 ppm to about 5,000 ppm, from about 1 ppm to about 5,000 ppm, from about 0.001 ppm to about 1,000 ppm, from about 0.01 ppm to about 1,000 ppm, from about 0.1 ppm to about 1,000 ppm, from about 1 ppm to about 1,000 ppm, from about 0.001 ppm to about 100 ppm, from about 0.01 ppm to about 100 ppm, from about 0.1 ppm to about 100 ppm, or from about 1 ppm to about 100 ppm. In certain embodiments, an amine is added to the top-pressure recovery turbine and is present in the top-pressure recovery turbine at a concentration of from about 0.01 ppm to about 10,000 ppm.

In certain embodiments, the blast furnace gas travels from the blast furnace to gas-cleaning equipment, and through the top-pressure recovery turbine. Thus, the top-pressure recovery turbine is located downstream from a blast furnace. In certain embodiments, the composition is added downstream from a dust collector. In certain embodiments, the composition is added directly to the top-pressure recovery turbine. In certain embodiments, the composition is added directly to blast furnace gas in a top-pressure recovery turbine.

Any suitable top-pressure recovery turbine can be used in the present methods. In certain embodiments, the top-pressure recovery turbine is a single flow turbine, double-flow multi-stage turbine, or dual duty multi-stage turbine.

The present methods can be used to treat a blast furnace gas of any temperature or pressure. In certain embodiments, the top-pressure recovery turbine comprises blast furnace gas having a temperature of from about 50° C. to about 200° C. Thus, in certain embodiments, the top-pressure recovery turbine comprises blast furnace gas having a temperature of from about 50° C. to about 200° C., from about 60° C. to about 200° C., from about 70° C. to about 200° C., from about 80° C. to about 200° C., from about 90° C. to about 200° C., from about 100° C. to about 200° C., from about 70° C. to about 190° C., from about 70° C. to about 180° C., from about 70° C. to about 170° C., from about 70° C. to about 160° C., from about 70° C. to about 150° C., from about 70° C. to about 140° C., from about 70° C. to about 130° C., and from about 70° C. to about 120° C. In certain embodiments, the blast furnace gas is at a pressure of at least about 1 bar, at least about 2 bar, or at least about 3 bar.

In certain embodiments, the invention provides the use of a composition comprising ammonia in a top-pressure recovery turbine.

In certain embodiments, the invention provides the use of a composition comprising a compound of formula (I), (II), or (III) in a top-pressure recovery turbine.

In certain embodiments, the composition is continuously added to the top-pressure recovery turbine.

EXAMPLE 1

This Example evaluates the deposit inhibition performance of certain nitrogen-containing compounds in accordance with an embodiment of the invention.

A dry TRT laboratory simulation experiment was performed to evaluate the effect of nitrogen-containing compounds on deposit inhibition. The deposit inhibition performance of various amines was compared at two dosages (i.e., dosage 1 and dosage 2). Dosage 2 was an amount 2.7 times greater than dosage 1. Hydrochloric acid, ammonia, and moisture were generated by decomposition of ammonium chloride. The ammonium chloride was placed in a 500 mL conical flask and heated at 200-215° C. using an oil bath. A rectangular SUS630 steel coupon (3×0.5×0.063) was hung vertically near the opening of the conical flask. The temperature near the coupon was 70° C.-100° C. An aqueous nitrogen-containing compound was dosed continuously using a syringe pump and the position of the needle end was at the bottom end of the coupon. The coupons were exposed to the simulated blast furnace conditions for 4 hours.

The coupons were analyzed by infrared spectroscopy and ammonical-N analysis (via spectrophotometeric method) of coupon wash water. The "weight gain" is the difference between the weight after and before the experiment. The deposit inhibition is calculated according the equation:

$$\% \text{ Deposit Inhibition} = 100 \times \left(1 - \frac{\text{Weight gain while dosing amine formulation}}{\text{Weight gain while dosing water}}\right).$$

Figure 1:
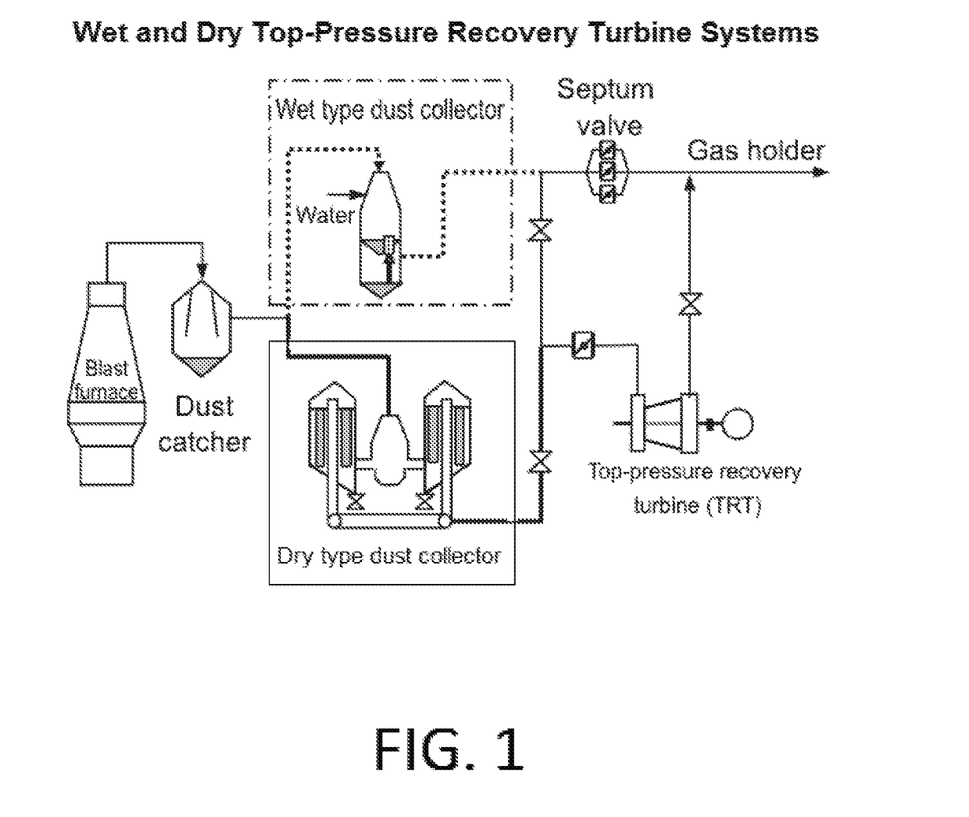
FIG. 1 is an example of a wet-type and dry-type top-pressure recovery turbine system used in blast furnace processes.
Figure 2:
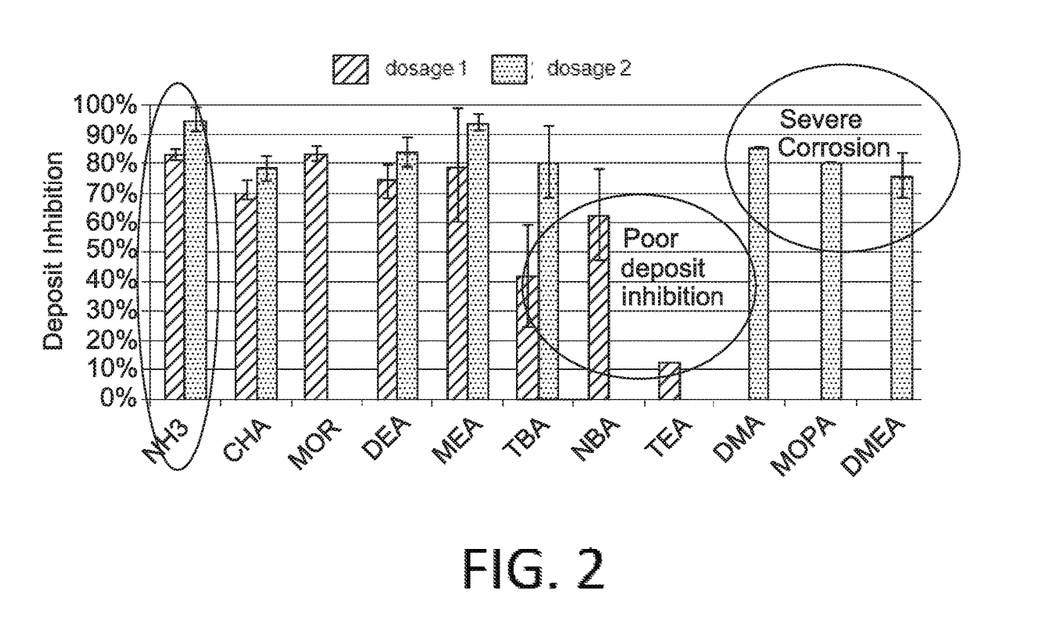
FIG. 2 is a bar graph illustrating deposit inhibition performance of various nitrogen-containing compounds.

A bar graph illustrating the deposit inhibition for various nitrogen-containing compounds is shown in FIG. 2, dosage 1 is located on the left and a dosage 2 is located in the right. As shown in FIG. 2, ammonia, cyclohexylamine (CHA), morpholine (MOR), diethylamine (DEA), and monoethanolamine (MEA) were effective at inhibiting deposition of ammonium chloride. As expected, a higher dosage was more effective than a lower dosage. As illustrated by FIG. 2, dimethylamine (DMA), methoxypropylamine (MOPA), and dimethylethanolamine (DMEA) were effective at inhibiting deposition of ammonium chloride, but severe corrosion was observed. Tri-butylamine (TBA), n-butylamine (NBA), and triethylamine (TEA) were less effective at inhibiting deposition of ammonium chloride.

This Example demonstrates that nitrogen-containing compounds can inhibit deposition of ammonium chloride. In particular, ammonia, cyclohexylamine, morpholine, diethylamine, and monoethanolamine were the most effective at inhibiting deposition of ammonium chloride.

EXAMPLE 2

This Example evaluates the deposit inhibition performance of nitrogen-containing compounds in accordance with an embodiment of the invention.

A dry TRT laboratory simulation experiment was performed to evaluate the effect of nitrogen-containing formulations on deposit inhibition as described in Example 1. In addition, corrosion inhibition of the same formulations was evaluated under identical conditions. For the deposit inhibition study, the coupon was kept in an air tight glass bottles purged with nitrogen and having 100 µL of deionized water for 7 days. The corrosion rate was calculated using ASTM G1-03 method (Standard Practice for Preparing, Cleaning, and Evaluating Corrosion Test Specimens). Corrosion inhibition was calculated according to the equations:

$$\% \text{ Corrosion Inhibition} = 100 \times \left(1 - \frac{\text{Corrosion rate for amine formulation dosed coupon}}{\text{Corrosion rate for water dosed coupon}}\right).$$

The deposit inhibition and corrosion inhibition of ammonia, cyclohexylamine (CHA), monoethanolamine (MEA), and morpholine (MOR) was analyzed and compared with two commercially available products (Commercial Product 1 and Commercial Product 2).

Figure 3:
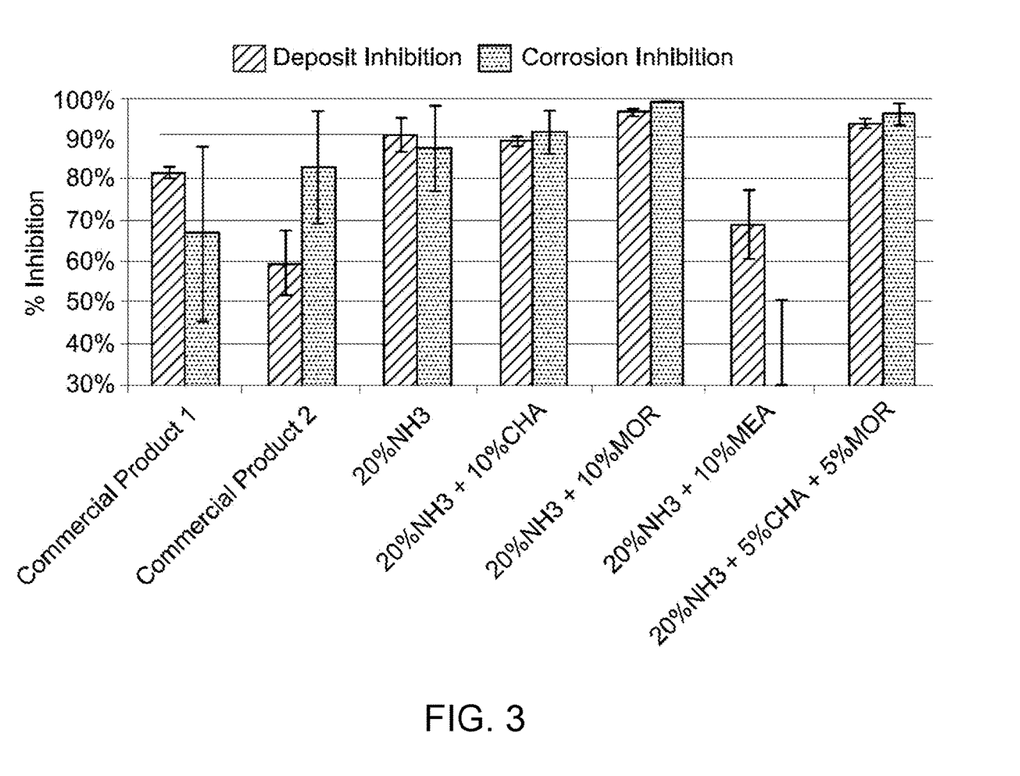
FIG. 3 is a bar graph that illustrates the deposit inhibition and corrosion inhibition performance of various nitrogen-containing compositions.

A bar graph illustrating the deposit inhibition and corrosion inhibition of various nitrogen-containing formulations is shown in FIG. 3. As shown in FIG. 3, 20% ammonia, 20% ammonia/10% morpholine, 20% ammonia/10% cyclohexylamine, and 20% ammonia/5% cyclohexylamine/5% morpholine were effective deposit inhibitors. The aforementioned formulations were more effective deposit inhibitors than the commercially-available products. The deposit and corrosion inhibition of the 20% ammonia/10% monoethanolamine formulation was low due to melting of the corresponding hydrochloride salt on the coupon surface.

This Example demonstrates that nitrogen-containing formulations can inhibit deposition of ammonium chloride and inhibit corrosion. In particular, ammonia, and ammonia mixtures of cyclohexylamine and morpholine were the most effective formulations for inhibiting deposition of ammonium chloride and metal corrosion.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Embodiments of this invention are described herein, including the best mode known to the inventors for carrying out the invention. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of reducing deposition of blast furnace gas solids in a top-pressure recovery turbine in a metal-producing process, the method comprising: adding a composition comprising ammonia to a top-pressure recovery turbine, wherein the composition is added as a gas, a liquid in the absence of solvent, or an aqueous solution comprising at least about 50% water.

2. The method of claim 1, wherein the composition further comprises an amine.

3. The method of claim 2, wherein the amine is a compound of formula (I)

formula (I)

wherein X is selected from O, S, or $CH_2$ and $R^1$ is selected from hydrogen, halogen, $C_1$-$C_8$ alkyl, $C_2$-$C_8$ alkenyl, $C_2$-$C_8$ alkynyl, or aryl, or X is $NR^2$ and each $R^1$ and $R^2$ is the same or different and is selected from hydrogen, halogen, $C_1$-$C_8$ alkyl, $C_2$-$C_8$ alkenyl, $C_2$-$C_8$ alkynyl, or aryl; and wherein each m and n is the same or different and is selected from 0, 1, or 2.

4. The method of claim 3, wherein the compound of formula (I) is morpholine.

5. The method of claim 2, wherein the amine is a compound of formula (II)

formula (II)

wherein X is O, $NR^2$, S, or $CH_2$; each $R^1$ and $R^2$ is the same or different and is selected from hydrogen, halogen, $C_1$-$C_8$ alkyl, $C_2$-$C_8$ alkenyl, $C_2$-$C_8$ alkynyl, or aryl; and each m and n is the same or different and is selected from 0, 1, or 2.

6. The method of claim 5, wherein the compound of formula (II) is cyclohexylamine.

7. The method of claim 2, wherein ammonia and the amine are at a molar ratio of from about 1:1 to about 20:1.

8. The method of claim 1, wherein the composition comprises 10-25% ammonia, 5-10% cyclohexylamine, 5-10% morpholine, and 50-80% water.

9. The method of claim 2, wherein the amine has a boiling point of from about −40° C. to about 175° C.

10. The method of claim 1, wherein the composition comprising ammonia is injected as an aqueous solution into blast furnace gas in the top-pressure recovery turbine.

11. The method of claim 1, wherein the top-pressure recovery turbine is a dry-type top-pressure recovery turbine.

* * * * *